United States Patent
Biskup et al.

(10) Patent No.: US 7,863,846 B2
(45) Date of Patent: Jan. 4, 2011

(54) ASSEMBLY OF A MOTOR VEHICLE BODY AND CONTROL DEVICE OF SUCH AN ASSEMBLY

(75) Inventors: Gregor Biskup, Kämpfelbach Ersingen (DE); Dejan Djordjevic, Stuttgart (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 417 days.

(21) Appl. No.: 12/114,884

(22) Filed: May 5, 2008

(65) Prior Publication Data

US 2008/0272729 A1   Nov. 6, 2008

(30) Foreign Application Priority Data

May 5, 2007   (DE) .................... 10 2007 021 180

(51) Int. Cl.
*G05B 5/00*   (2006.01)
(52) U.S. Cl. .................... 318/466; 318/560; 318/565; 318/626; 318/467
(58) Field of Classification Search .............. 318/560, 318/565, 626, 638, 652, 466, 467, 468, 489
See application file for complete search history.

(56) References Cited

U.S. PATENT DOCUMENTS

| | | | |
|---|---|---|---|
| 5,793,173 A | 8/1998 | Henschel et al. | |
| 6,225,770 B1 * | 5/2001 | Heinrich et al. | 318/463 |
| 6,297,606 B1 * | 10/2001 | Yoshioka et al. | 318/467 |
| 6,597,139 B1 * | 7/2003 | Klesing | 318/445 |
| 6,922,031 B2 * | 7/2005 | Engelgau et al. | 318/286 |
| 7,248,011 B2 | 7/2007 | Schachtl et al. | |
| 7,322,638 B2 | 1/2008 | Larson | |
| 7,402,971 B2 * | 7/2008 | Averitt | 318/466 |

FOREIGN PATENT DOCUMENTS

| | | |
|---|---|---|
| DE | 3829405 A1 | 3/1990 |
| DE | 4229439 A1 | 3/1994 |
| DE | 19523210 C1 | 10/1996 |
| DE | 10331633 A1 | 2/2005 |
| DE | 10 2005 030 203 A1 | 1/2007 |

* cited by examiner

*Primary Examiner*—Bentsu Ro
*Assistant Examiner*—Thai Dinh

(57) ABSTRACT

A control device is provided for an assembly of a motor vehicle body, which assembly can be moved between at least two positions, specifically at least between a position retracted to the maximum extent and a position deployed to the maximum extent, in particular a spoiler. The control device contains a first sensor which transmits a signal to an evaluation device, which determines the position of the assembly from the signal of the first sensor, in dependence on the rotational speed of a motor which serves to move the assembly, and a second sensor which monitors a deployed position of the assembly and transmits a corresponding signal to the evaluation device. The evaluation device corrects the signal provided by the first sensor when the assembly is at least temporarily located in the position monitored by the second sensor and the signal provided by the first sensor is outside a tolerance range.

12 Claims, 2 Drawing Sheets

ASSEMBLY OF A MOTOR VEHICLE BODY AND CONTROL DEVICE OF SUCH AN ASSEMBLY

CROSS-REFERENCE TO RELATED APPLICATION

This application claims the priority, under 35 U.S.C. §119, of German application DE 10 2007 021 180.7, filed May 5, 2007; the prior application is herewith incorporated by reference in its entirety.

BACKGROUND OF THE INVENTION

Field of the Invention

The invention relates to a control device of an assembly of a motor vehicle body, which assembly can be moved between at least two positions, specifically at least between a position retracted to the maximum extent and a position deployed to the maximum extent, in particular a spoiler. The control device contains a first sensor which transmits a signal to an evaluation device, which determines the position of the assembly from the signal of the first sensor, in dependence on a rotational speed of a motor which serves to move the assembly. The invention also relates to a movable assembly of a motor vehicle body, in particular a spoiler.

Published, non-prosecuted German patent application DE 10 2005 030 203 A1 discloses a movable assembly of a vehicle body, which assembly is in the form of a spoiler. The spoiler described be moved between a position retracted to the maximum extent and a position deployed to the maximum extent, it being possible for the spoiler to assume further defined positions, so-called intermediate positions, between the position retracted to the maximum extent and the position deployed to the maximum extent.

A spoiler of this type which is known from the prior art can be moved between the individual positions with the aid of a motor which is associated with the spoiler, with the movement of the spoiler being controlled and/or regulated by a control device. In this case, it is already known from practice that a control device for a movable spoiler contains a sensor which is in the form of an incremental transmitter or pulse transmitter and transmits a signal to an evaluation device, which determines the position of the spoiler from the signal of the sensor, in dependence on the rotation speed of the motor. Incremental transmitters or pulse transmitters of this type are preferably Hall sensors.

Particularly when there are no mechanical stops for the positions into which the spoiler can be moved, that is to say the spoiler cannot be blocked in these positions, the problem arises of the signal provided by the incremental transmitter or pulse transmitter being subject to a drift with respect to time, so that the position of the spoiler can then no longer be correctly derived from the signal of the incremental transmitter or pulse transmitter. This is disadvantageous.

BRIEF SUMMARY OF THE INVENTION

It is accordingly an object of the invention to provide an assembly of a motor vehicle body and a control device of such an assembly which overcome the above-mentioned disadvantages of the prior art devices of this general type, which assembly can be moved between at least two positions, with the aid of which control device the position of the movable assembly can be detected more accurately. The invention is also based on the problem of providing a novel, movable assembly of a motor vehicle body.

The control device contains a first sensor which transmits a signal to an evaluation device. The evaluation device determines the position of the assembly from the signal of the first sensor, in dependence on the rotational speed of a motor which serves to move the assembly, and a second sensor which monitors a deployed position of the assembly and transmits a corresponding signal to the evaluation device. The evaluation device corrects the signal provided by the first sensor when the assembly is at least temporarily located in a position monitored by the second sensor and the signal provided by the first sensor is outside a tolerance range.

In addition to the first sensor, on the basis of whose signal the position of the movable assembly is determined, the control device according to the invention also contains a second sensor with the aid of whose signal the signal provided by the first sensor can be corrected, specifically when the signal provided by the first sensor is outside a tolerance range. As a result, a signal drift, which occurs over time, of the signal provided by the first sensor can be corrected. This ensures that the position of the assembly can be correctly determined on the basis of the signal provided by the first sensor over the entire operating time of the motor vehicle or the movable assembly itself.

The evaluation device preferably corrects the signal provided by the first sensor in dependence on the movement direction of the assembly, specifically in dependence on a movement-direction-dependent tolerance range around the position monitored by the second sensor and/or in dependence on a movement-direction-dependent correction value.

In accordance with an added feature of the invention, the evaluation device corrects the first signal in dependence on a movement direction of the assembly. The first signal is corrected by a first correction value when the assembly is moved in a direction of the position deployed to the maximum extent and in the process is moved at least temporarily into a position monitored by the second sensor and in this case the first signal is outside a first tolerance range around the position monitored by the second sensor. The first signal is corrected by a second correction value when the assembly is moved in a direction of the position deployed to the maximum extent and in the process is moved at least temporarily into the position monitored by the second sensor and in this case the first signal is situated outside a second tolerance range around the position monitored by the second sensor.

Preferably, the first tolerance range and the second tolerance range are of different magnitude and accordingly are dependent on the movement direction.

In accordance with another feature of the invention, the first tolerance range and the second tolerance range are of equal magnitude and accordingly are independent of the movement direction.

In accordance with a further feature of the invention, the first correction value and the second correction value, by which the first signal is corrected, are of different magnitude and accordingly are dependent on a movement direction.

In accordance with an additional feature of the invention, the first correction value and the second correction value, by which the first signal is corrected, are of equal magnitude and accordingly are independent of a movement direction.

In accordance with a concomitant feature of the invention, the first sensor and the second sensor are in a form of incremental transmitters, in particular Hall sensors.

Other features which are considered as characteristic for the invention are set forth in the appended claims.

Although the invention is illustrated and described herein as embodied in an assembly of a motor vehicle body and a control device of such an assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
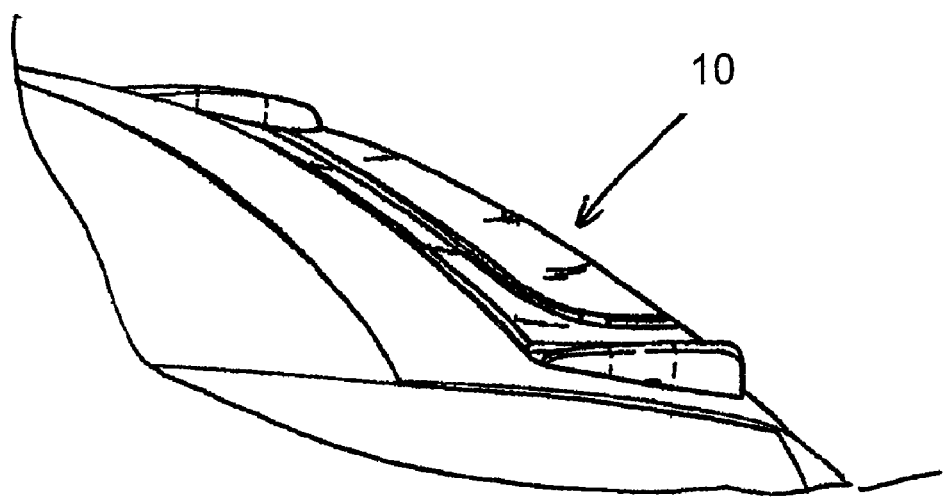
FIG. 1 is a diagrammatic, perspective view of a movable assembly of a motor vehicle body, which assembly is in a form of a spoiler, in a position retracted to the maximum extent and according to the invention.
Figure 2:
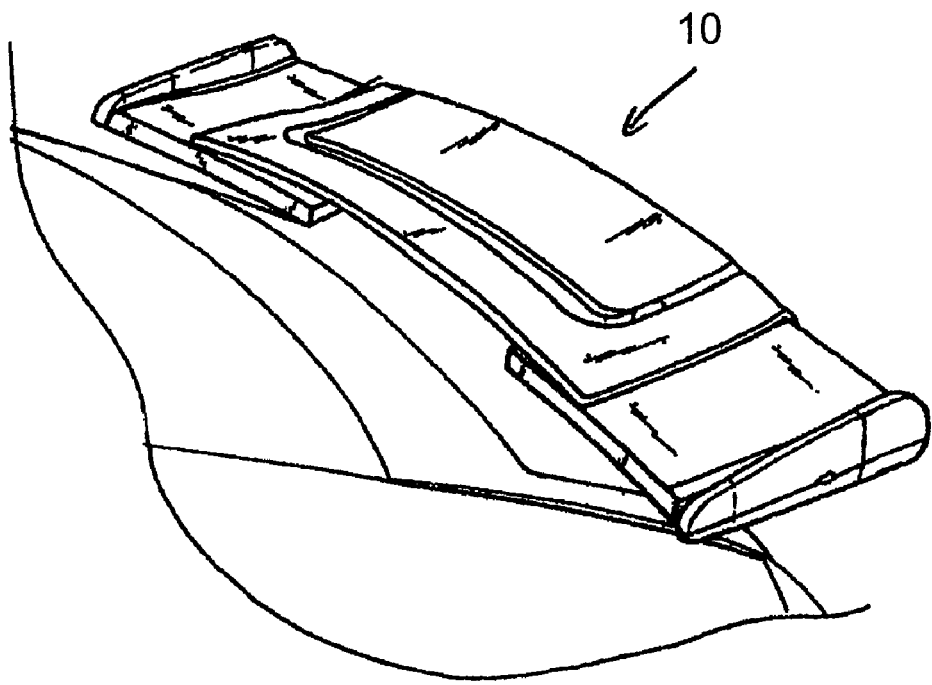
FIG. 2 is a diagrammatic, perspective view of the movable assembly of FIG. 1 in a position deployed to the maximum extent.

Referring now to the figures of the drawing in detail and first, particularly, to FIGS. 1 and 2 thereof, there is shown a detail of a rear part of a motor vehicle body in a region of a movable assembly of the motor vehicle body, which assembly is in the form of a spoiler 10. FIGS. 1 and 2 show the spoiler 10 in two different positions, specifically in a position retracted to a maximum extent in FIG. 1 and in a position deployed to a maximum extent in FIG. 2.

The spoiler 10 can be moved between these two positions with the aid of a motor, it being possible for the spoiler 10 to assume other positions in addition to these two positions which are illustrated in FIGS. 1 and 2, the other positions being situated between the position retracted to the maximum extent in FIG. 1 and the position deployed to the maximum extent in FIG. 2. The spoiler 10 is moved between the individual positions with the aid of a control device which controls and/or regulates the motor which is associated with the spoiler 10.

The configuration details of a spoiler 10 of this type are familiar to the person skilled in the art in question and therefore do not need to be explained any further. The text which follows is concerned with those details of a control device of the spoiler 10 with which it can be ensured that the correct position of the spoiler 10 can always be determined.

The control device of the movable assembly of a motor vehicle body, which assembly is in the form of a spoiler in the exemplary embodiment shown, has a first sensor which transmits a signal to an evaluation device in dependence on a rotational speed of the motor which serves to move the assembly. The first sensor is configured as an incremental transmitter or pulse transmitter, preferably as a Hall sensor. The evaluation device determines the position of the movable assembly of the motor vehicle body from the signal provided by the first sensor.

In addition to the first sensor, the control device has a second sensor which monitors the deployed position of the assembly, in particular a so-called intermediate position of the assembly of the motor vehicle body, which assembly is in the form of a spoiler. The second sensor also transmits a corresponding signal to the evaluation device, with the second sensor, like the first sensor, being configured as an incremental transmitter or pulse transmitter, preferably as a Hall sensor.

According to the invention, the signal provided by the second sensor serves to correct the signal provided by the first sensor, specifically in such a way that the signal provided by the first sensor is corrected when the movable assembly of the motor vehicle, which assembly is in the form of a spoiler in the exemplary embodiment shown, is located in the position monitored by the second sensor and the signal provided by the first sensor is outside a tolerance range. The signal provided by the first sensor is preferably corrected in dependence on the movement direction of the movable assembly of the motor vehicle body.

The manner of operation of the control device according to the invention for the movable assembly of the motor vehicle body, which assembly is in the form of a spoiler in the exemplary embodiment shown, is described in greater detail below with reference to the signal flowchart of FIG. 3.

Figure 3:
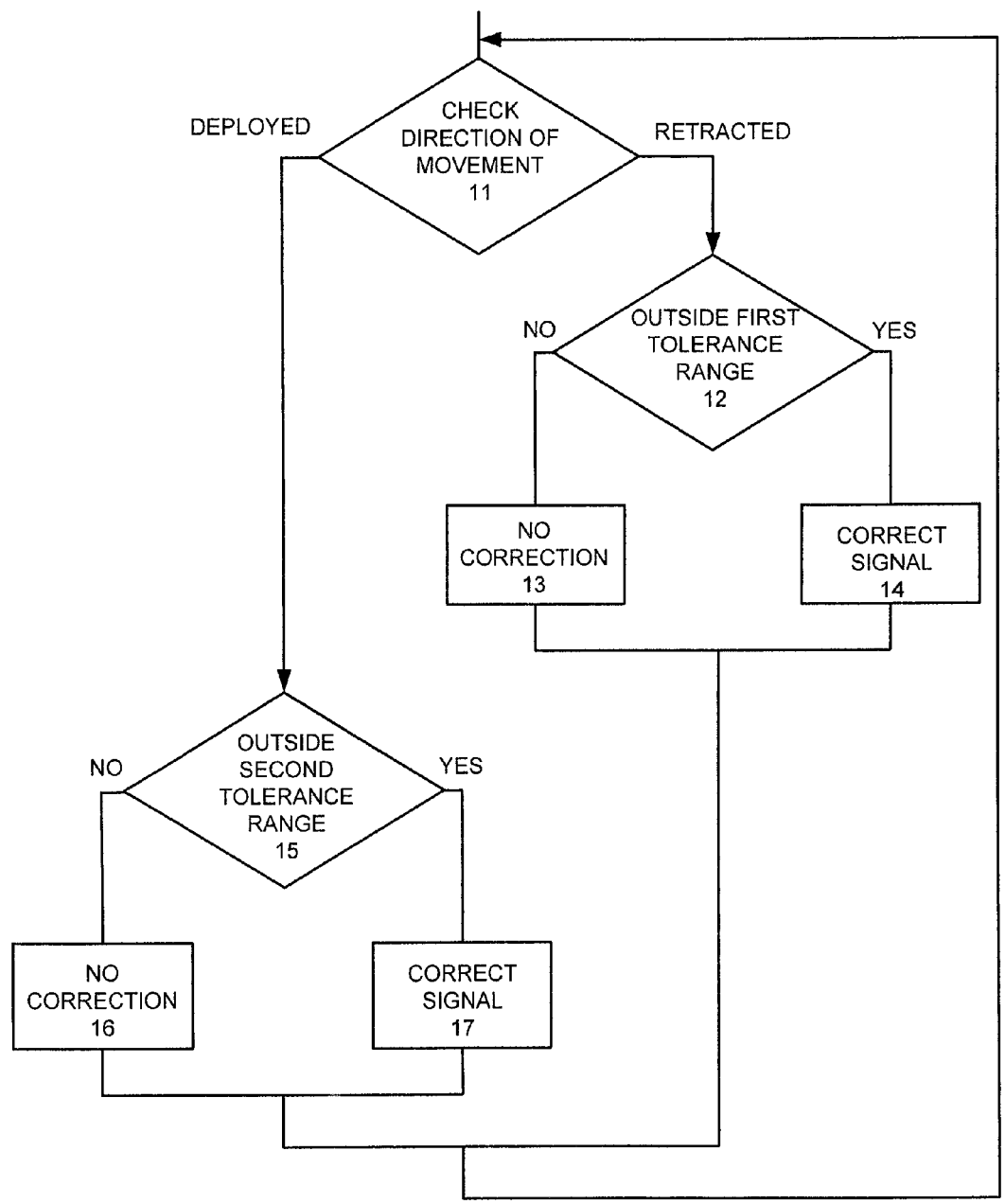
FIG. 3 is a signal flowchart for explaining the manner of operation of the control device of the movable assembly of a motor vehicle body.

In block 11 of the signal flowchart of FIG. 3, the control device checks the direction in which the movable assembly of the motor vehicle body is moved.

A jump is made from block 11 to block 12 when the assembly is moved in the direction of the position retracted to the maximum extent, that is to say is retracted further. If, in contrast, it is established in block 11 that the movable assembly of the motor vehicle body is moved in the direction of the position deployed to the maximum extent, that is to say is deployed further, a jump is made from block 11 to block 15.

As already stated, the control device jumps from block 11 to block 12 when it establishes in block 11 that the movable assembly is retracted. When the movable assembly is at least temporarily moved into the position monitored by the second sensor during the retraction process, a check is made in block 12 to determine whether the signal provided by the first sensor is outside a first tolerance range around the position monitored by the second sensor in this case. If it is established here that the signal provided by the first sensor is within the first tolerance range around the position monitored by the second sensor, a jump is made from block 12 to block 13, with the signal provided by the first sensor not being corrected in this case. If, in contrast, it is established in block 12 that the signal provided by the first sensor is outside the first tolerance range around the position monitored by the second sensor, a jump is made from block 12 to 14, with the control device then correcting the signal provided by the first sensor by a first correction value in block 12.

As already stated, a jump is made from block 11 to block 15 when it is established in block 11 that the movable assembly of the motor vehicle body is deployed, with the control device checking in block 15 whether the signal provided by the first sensor is outside a second tolerance range around the position monitored by the second sensor when the assembly is moved at least temporarily into the position monitored by the second sensor during deployment of the assembly. If it is established here that the signal provided by the first sensor is within the second tolerance range around the position monitored by the second sensor, a jump is made from block 15 to block 16, with the signal provided by the first sensor not being corrected in this case.

If, in contrast, it is established in block 15 that the signal provided by the first sensor is outside the second tolerance range around the position monitored by the second sensor, a jump is made from block 15 to block 17, with the control device then correcting the signal provided by the first sensor by a second correction value in block 17.

The first tolerance range and the second tolerance range can, like the first correction value and the correct second correction value, be of equal magnitude. In this case, the two tolerance ranges and correction values are then independent of the movement direction of the movable assembly of the motor vehicle body.

However, as already stated above, the evaluation device of the control device preferably corrects the signal provided by the first sensor in dependence on the movement direction of the assembly. This can be performed in a variety of ways.

Although the two tolerance ranges are of equal magnitude and accordingly are independent of the movement direction according to a first, preferred variant, the two correction values are, in contrast, of different magnitude and accordingly are dependent on the movement direction. Play can be compensated when the correction values are of different magnitude depending on the movement direction.

According to a second alternative, it is also possible for the two tolerance ranges to be of different magnitude and accordingly be dependent on the movement direction, but also for the two correction values to be of equal magnitude and accordingly be independent of the movement direction.

According to a third alternative, it is also possible for both the two tolerance ranges and the two correction values to respectively be of different magnitude and accordingly to respectively be dependent on the movement direction of the movable assembly.

The two sensors are preferably configured as Hall sensors. As already stated, the first sensor monitors the entire adjustment region of the movable apparatus.

In contrast, the second sensor monitors only one position of the movable apparatus, preferably the first position of the assembly, which position is deployed to the minimum extent in contrast to the position deployed to the maximum extent. This position is a safety-relevant position since the driving behavior of the motor vehicle changes considerably when the spoiler leaves the position retracted to the maximum extent. The second sensor is accordingly a safety-relevant sensor.

The invention has been described using the example of a spoiler. The invention can also be used in other movable assemblies of a motor vehicle body, specifically preferably in assemblies whose position cannot be blocked and accordingly cannot strike a mechanical stop.

The invention claimed is:

1. A control device for an assembly of a motor vehicle body, the assembly being moved between at least two positions including a position retracted to a maximum extent and a position deployed to a maximum extent, the control device comprising:
    a first sensor generating and transmitting a first signal;
    an evaluation device receiving the first signal from said first sensor, said evaluation device determining a position of the assembly from the first signal, in dependence on a rotational speed of a motor serving to move the assembly; and
    a second sensor monitoring a deployed position of the assembly and transmitting a second signal to said evaluation device, said evaluation device correcting the first signal when the assembly is at least temporarily located in a position monitored by said second sensor and the first signal is outside a tolerance range.

2. The control device according to claim 1, wherein said evaluation device corrects the first signal in dependence on a movement direction of the assembly.

3. The control device according to claim 1, wherein the first signal is corrected by a first correction value when the assembly is moved in a direction of the position deployed to the maximum extent and in the process is moved at least temporarily into a position monitored by said second sensor and in this case the first signal is outside a first tolerance range around the position monitored by said second sensor.

4. The control device according to claim 3, wherein the first signal is corrected by a second correction value when the assembly is moved in a direction of the position deployed to the maximum extent and in the process is moved at least temporarily into the position monitored by said second sensor and in this case the first signal is situated outside a second tolerance range around the position monitored by said second sensor.

5. The control device according to claim 4, wherein the first tolerance range and the second tolerance range are of different magnitude and accordingly are dependent on the movement direction.

6. The control device according to claim 4, wherein the first tolerance range and the second tolerance range are of equal magnitude and accordingly are independent of the movement direction.

7. The control device according to claim 4, wherein the first correction value and the second correction value, by which the first signal is corrected, are of different magnitude and accordingly are dependent on a movement direction.

8. The control device according to claim 4, wherein the first correction value and the second correction value, by which the first signal is corrected, are of equal magnitude and accordingly are independent of a movement direction.

9. The control device according to claim 1, wherein said first sensor and said second sensor are in a form of incremental transmitters.

10. The control device according to claim 1, wherein said first sensor and said second sensor are Hall sensors and the assembly is a spoiler.

11. An assembly of a motor vehicle body, the assembly being moved between at least two positions including a position retracted to a maximum extent and a position deployed to a maximum extent, the assembly comprising:
    a control device containing:
        a first sensor generating and transmitting a first signal;
        an evaluation device receiving the first signal from said first sensor, said evaluation device determining a position of the assembly from the first signal of said first sensor, in dependence on a rotational speed of a motor serving to move the assembly;
        a second sensor monitoring a deployed position of the assembly and transmitting a second signal to said evaluation device, said evaluation device correcting the first signal when the assembly is at least temporarily located in a position monitored by said second sensor and the first signal is outside a tolerance range.

12. The assembly according to claim 11, wherein the assembly is a spoiler.

* * * * *